United States Patent
Holly

(10) Patent No.: US 7,490,565 B2
(45) Date of Patent: Feb. 17, 2009

(54) SEED DISTRIBUTION METHOD AND APPARATUS

(76) Inventor: John Holly, 21 Arthurton Road, Northcote, Victoria 3070 (AU)

( * ) Notice: Subject to any disclaimer, the term of this patent is extended or adjusted under 35 U.S.C. 154(b) by 51 days.

(21) Appl. No.: 10/567,194

(22) PCT Filed: Aug. 5, 2004

(86) PCT No.: PCT/AU2004/001040

§ 371 (c)(1),
(2), (4) Date: Feb. 3, 2006

(87) PCT Pub. No.: WO2005/011358

PCT Pub. Date: Feb. 10, 2005

(65) Prior Publication Data

US 2006/0278726 A1 Dec. 14, 2006

(30) Foreign Application Priority Data

Aug. 5, 2003 (AU) .............................. 2003904353

(51) Int. Cl.
*A01C 7/00* (2006.01)
*A01C 9/00* (2006.01)
(52) U.S. Cl. .................. 111/174; 111/179; 111/180; 111/181; 111/182; 111/900; 111/903; 111/904; 111/921; 111/922

(58) Field of Classification Search ................. 111/903, 111/904

See application file for complete search history.

(56) References Cited

U.S. PATENT DOCUMENTS 3,434,437 A 3/1969 Mark et al.
4,399,757 A 8/1983 Maury

FOREIGN PATENT DOCUMENTS

| CN | 1335049 | 2/2002 |
|---|---|---|
| EP | 100723 B | 9/1985 |
| RU | 1824047 A1 | 6/1993 |
| SU | 1540689 A1 | 2/1990 |

*Primary Examiner*—Christopher J. Novosad
(74) *Attorney, Agent, or Firm*—Brooks Kushman P.C.

(57) ABSTRACT

A seeding apparatus comprising: (a seed distribution metering means including a rotating d drum with apertures on its periphery and a vacuum generator for generating a suction pressure inside the drum so that seeds are attracted to the apertures; (b) feeding system including a hopper, gravitational acceleration chamber, velocity controlling elements such as a flap and continuous belts for feeding seeds at a required amount and speed to the drum; (c) release mechanisms including an air-jet for releasing metered seeds from the drum along a selected trajectory while unselected seeds follow another trajectory, delivery device including an adjustable flow venturi and electronic sensor for controlling delivery of metered seeds.

32 Claims, 12 Drawing Sheets

SECTIONS 1 AND 2

SECTION A

SECTION A
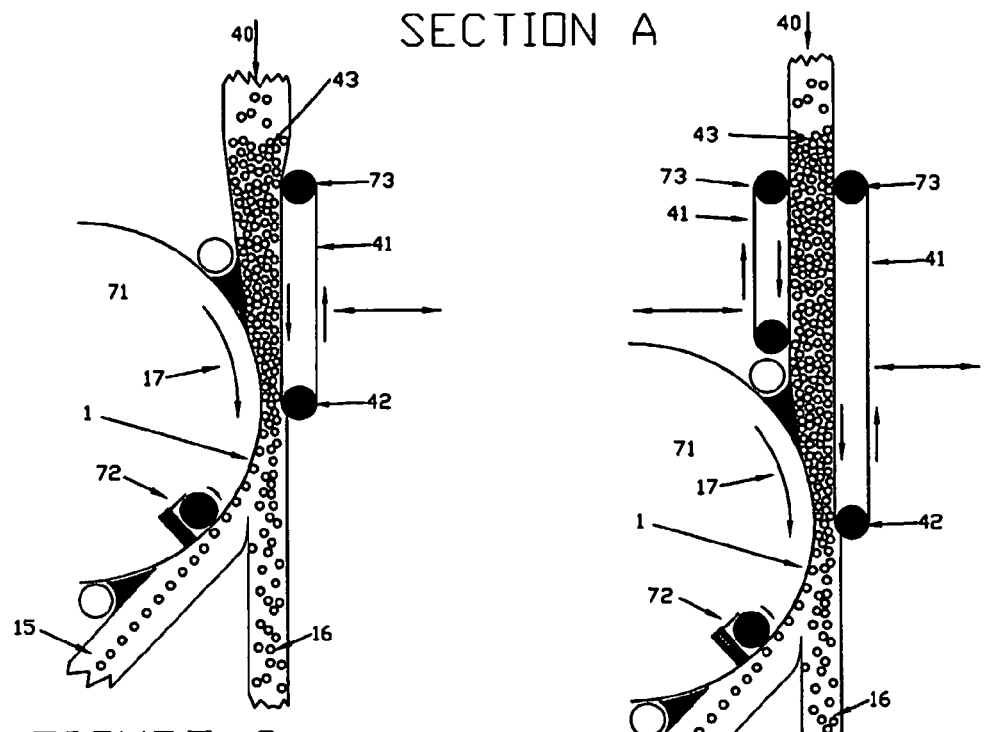
FIGURE 8
FIGURE 9
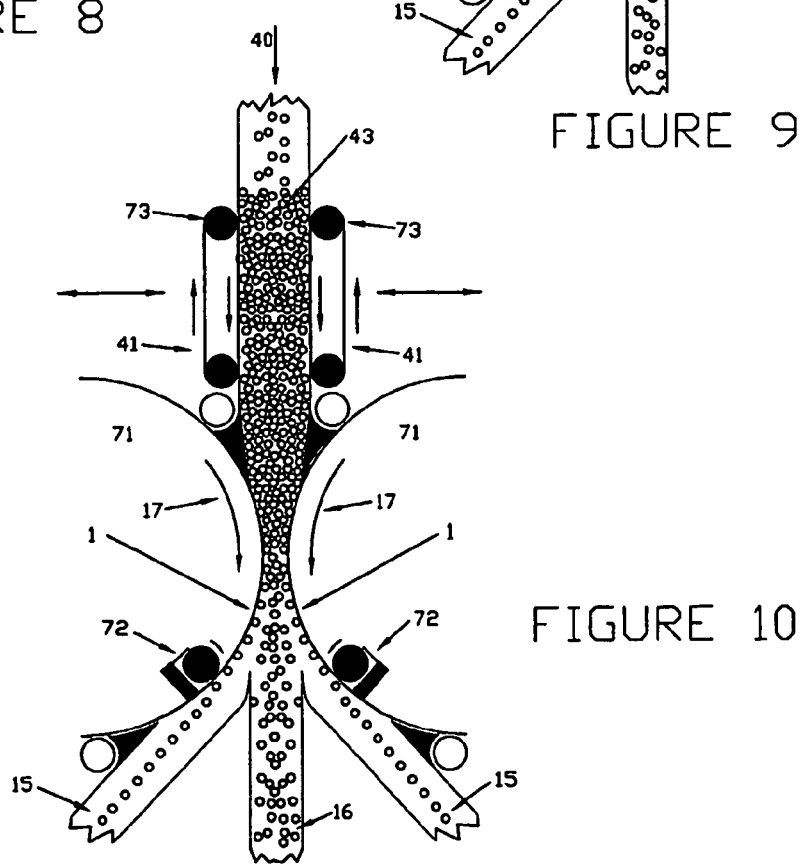
FIGURE 10

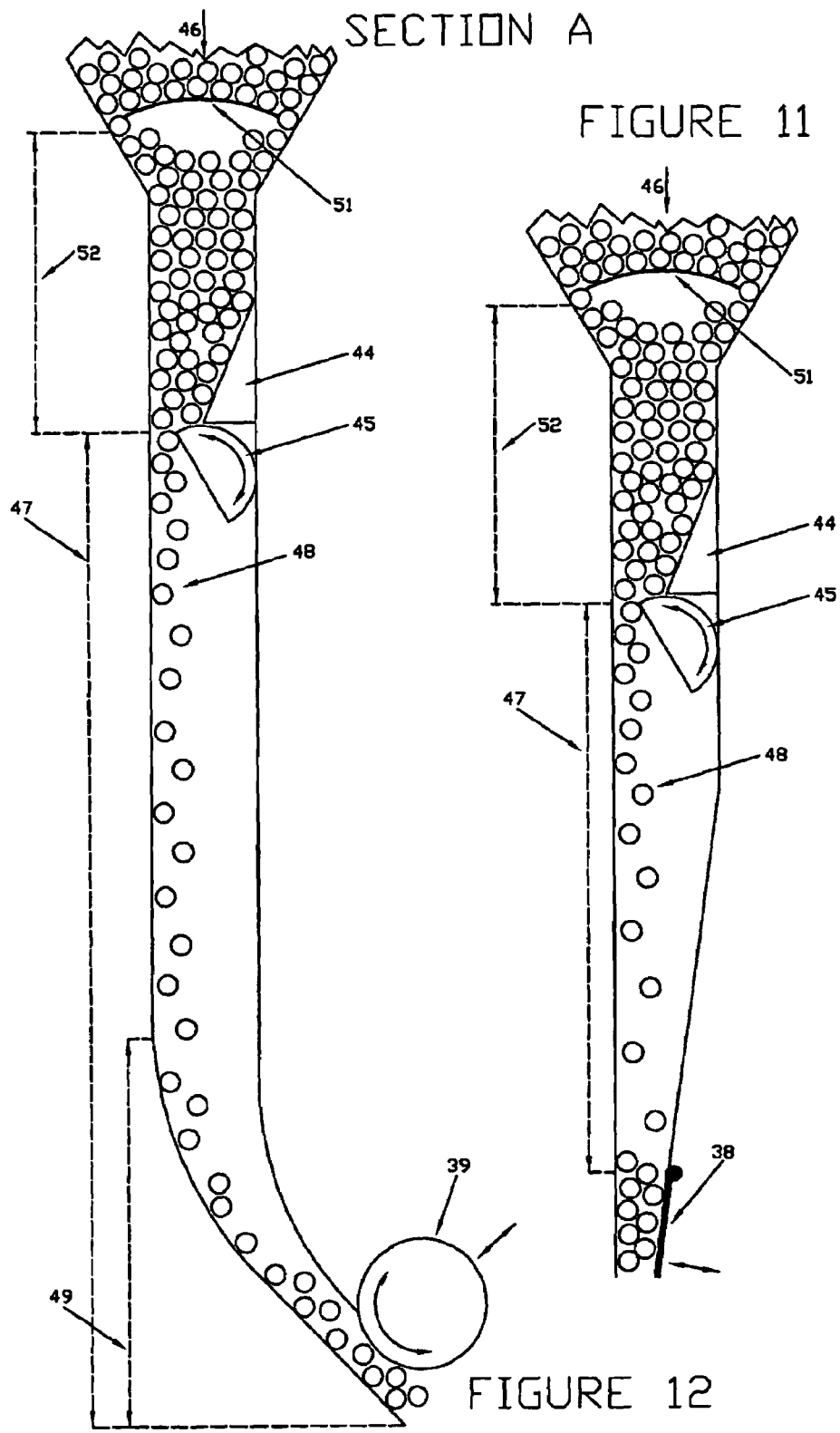

SECTION A

SECTION B
FIGURE 14
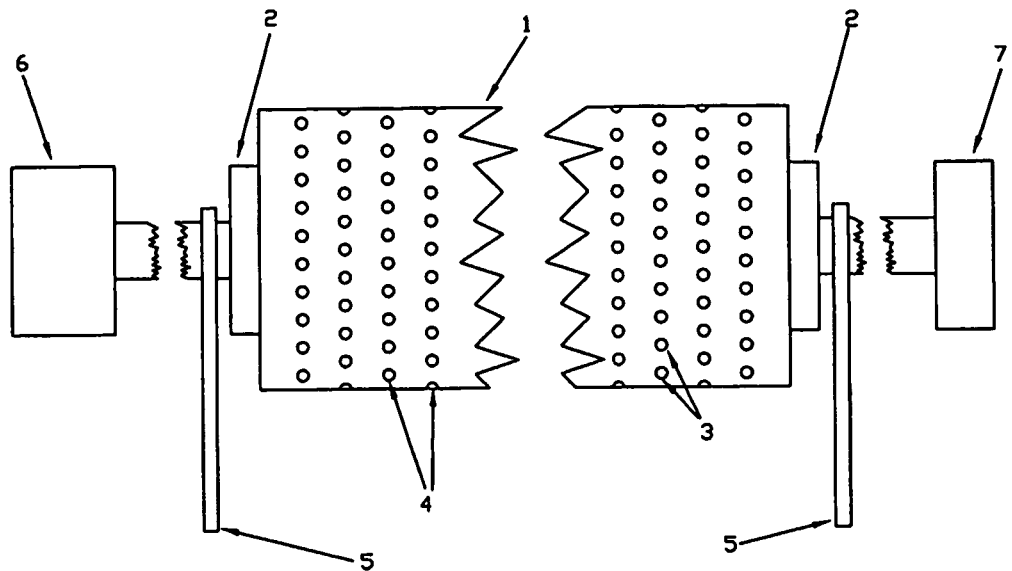
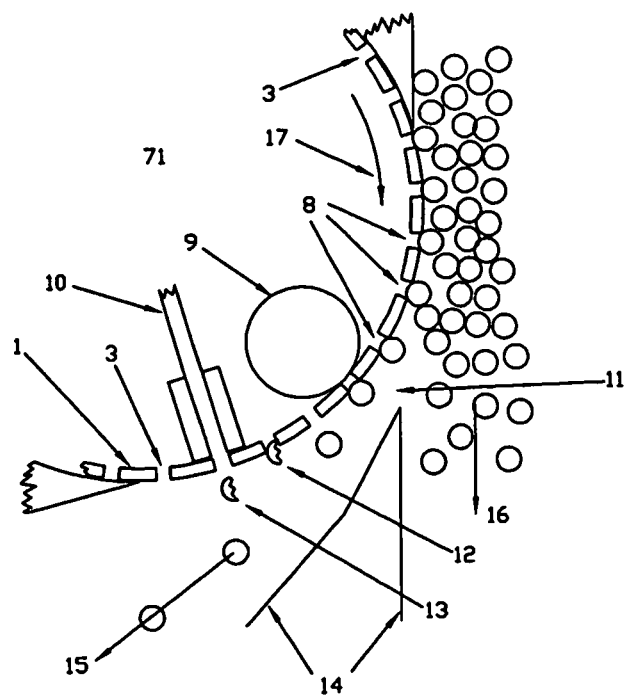
FIGURE 15

SECTION B

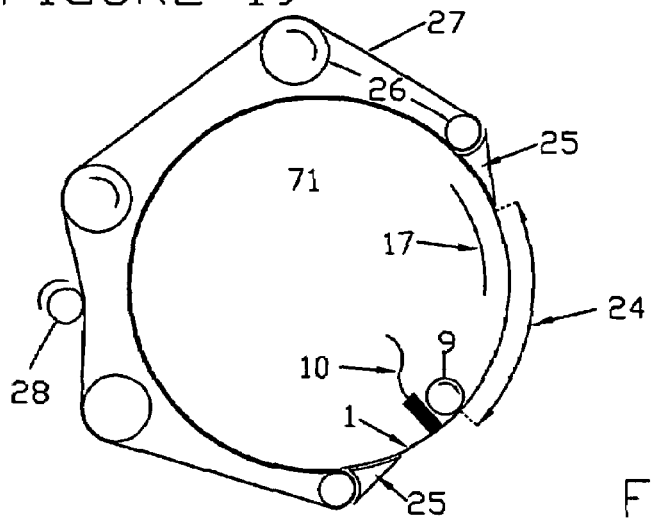
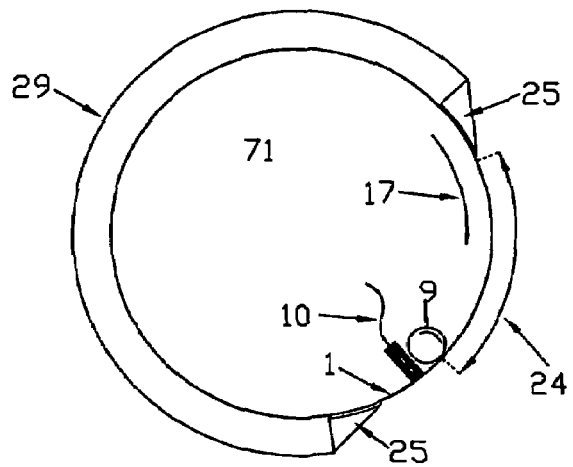
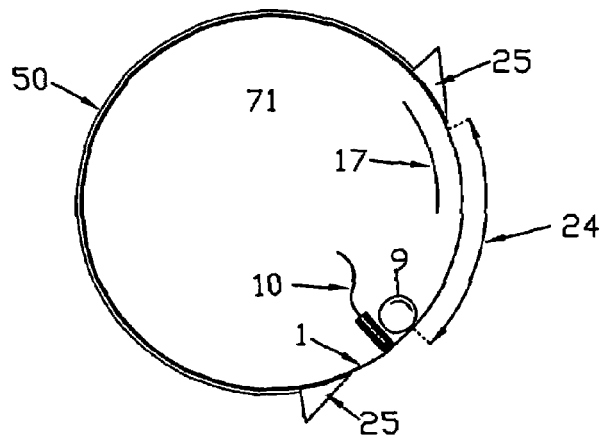

SECTIONS C AND D

SECTION G

SEED DISTRIBUTION METHOD AND APPARATUS

FIELD OF THE INVENTION

This invention relates to a method of seed distribution and an apparatus for achieving this. However the invention is also related to distribution of other particulate matter in the field of farming including fertilisers, fungicides, insecticides, herbicides and mixtures. Throughout this document reference to the word "seeds" includes singular seed and plural seeds and also includes other particulate matter in the field of farming including particulate forms of fertilisers, fungicides, insecticides, herbicides and mixtures.

BACKGROUND ART

For many plant species there has been determined a relationship between plant populations or densities on a given area and the resulting yields. Overcrowding reduces yield due to excessive competition between plants for light, moisture and nutrients as well as increasing risk of disease due to inadequate ventilation. Underpopulating reduces yield due to unused or wasted potential cropping area. This relationship applies to most crops. However in this document an illustrative reference will be made to one type of cereal crop-wheat. This is by way of example and is not limiting.

The sowing operation is very important in determining the yield of a particular crop. Most seeding apparatuses used in broad acre wheat cropping use a "sprinkle" technique to generally toss seeds in rows about 150 millimeters or more apart. These seeds are initially metered out using rollers or various shaped gears adjusted to give selected flow rates. Pneumatic systems can be used to carry the seeds through a system of pipes to divider heads which separate the seeds into multiple elongated channels that can extend laterally away from the seeder over a number of rows where it is allowed to sprinkle into the row.

Usually the seeding rate is determined by the seed flow rate from the apparatus however this is an average flow rate. It can be seen that although in this sprinkling there might have been some initial metering this becomes only an average metering at the various outlets. Further the drop from a channel outlet can result in its own variation of placement.

This result might seem to fulfill the required distribution to produce a maximum yield on the macro level but due to the affect of overpopulation and underpopulation on the micro level the average macro distribution of seed does not result in maximum yield. The overall result is that there can be 50% or more of the seeds in an overpopulated or underpopulated arrangement on the micro level although the average might be near the required. Each patch of overpopulated or underpopulated seeds is a micro growing location with its deficits because of the immediate vicinity and is not particularly compensated by the average macro location population density.

Less competition from neighbours for root space, nutrients, moisture and light all contribute to an increase in yield made possible through vigorous early growth of seedlings in the crop establishment phase. This results in earlier ground cover with the shading by crop leaves slowing soil moisture loss from sun and wind as well as smothering weed development. All these factors are known to dramatically assist yields. However on the micro level if there is overpopulation there is over competition resulting in a decrease of yield. Further there is increased risk of disease from insufficient ventilation. Alternatively if the spacing is considerable there is space for weeds to establish or open areas which are unproductive and which increase the likelihood of drying out the soil. Therefore it is the balance and correct spacing on the micro level which is required for maximum yields. To this end the overall percentage of overpopulated and underpopulated sowing must be substantially reduced.

There are a range of known sowing apparatuses in use at present. Some of these use vacuum systems to pick up seeds and to break the vacuum to release the seed for planting. Disc and drum vacuum planters are two types of vacuum systems.

A disc system is shown in U.S. Pat. No 4,469,244 which discloses a suction-type distributor for a single-seed seeder with a rotary apertured disk. The distributor includes an aperture disk rotating in a casing and two adjoining selector plates pivoted from the casing and provided with alternate projections spaced on their edges extending around the path of apertures on the disk so as to straddle said path. The relative angular position of the two plates are adjustable by means of a single lever provided with cams and pivoted on casing.

A drum system is shown in U.S. Pat. No. 4,306,509 which discloses an apparatus for continuously metering seeds onto a seedbed and simultaneously pressing the seeds into the soil. The seed planting apparatus includes a drum adapted to be moved in rolling contact across the seedbed, and which transports seeds on its peripheral wall from a hopper to the seedbed. The seeds are retained against apertures in the peripheral wall by means of a vacuum transmitted to the apertures through manifolds within the drum that are interconnected with a vacuum pump by means of individual hoses. A cam interrupts the vacuum by compressing the hoses when the seed-bearing apertures contact the seedbed, thereby releasing the seeds and pressing them into the soil. The seeds are preferably placed on the seedbed in a uniformly spaced array predetermined by the uniform alignment and spacing of the apertures on the wall of the drum. An air brush is also included to remove substantially all excess seeds from the apertures before the apertures rotate from beneath the hopper, and a brush removes soil and debris from the exterior wall of the drum before the apertures re-enter the hopper.

Another system is shown in U.S. Pat. No. 6,564,729 which has a vacuum seed metering assembly for evenly distributing seeds from a seed hopper includes a rotating perforated drum and a pair of stationary walls forming a suction area and a release area inside the drum. The suction area is adjacent a seed hopper such that individual seeds are held to apertures in the drum by suction as the apertures pass by the seed hopper. As the drum rotates, each seed is released into an associated distribution tube when the aperture passes into the release area.

A major problem with such systems is they operate at relatively slow speeds, which thereby restricts the machines planting speed. All known vacuum planter apparatuses using rotating drums or discs pick up individual stationary seeds from a pick-up area and rotate the seeds to a spaced drop off location. This can only be achieved at relatively low rotation speeds. At higher speeds the moving drum or disc surface passes the stationary seeds in the pickup zone too quickly to pick up the seed. Therefore the majority of these vacuum planter machines are limited to maximum sowing ground speeds of about 12 to 15 kilometers per hour.

It is therefore a first object of the invention to improve maximum yield by providing a seed distribution method and apparatus which improves the micro growing location by lowering the percentage of overpopulated or underpopulated seed density.

It is a second object of the invention to provide a method of seed distribution and a seeding apparatus, which allows accurate faster seeding than the above conventional means.

It is a third object of the invention to provide a method for the placement of the individual seeds within each row at a selected spacing together with the ability to space multiple rows each at a selected distance apart, both these being variable and easily changed, to provide numerous sowing grid options.

It is a fourth object of the invention to provide an apparatus which can place predominantly individual seeds at considerable speed enabling the rapid sowing of a grid pattern which gives the optimum plant population outcome required for a particular crop.

It is a further object of the invention to provide an improved method of seed distribution and a seeding apparatus, which overcomes or at least ameliorates the problems of the prior art.

SUMMARY OF THE INVENTION

In accordance with the invention there is provided a method of seed distribution and a seeding apparatus for achieving this, which includes a seed feed system and a moving metering system with the feed system providing an acceleration of seed that provides substantially stationary relative velocity of seed from the seed feed system to the moving surface of the metering system. Such substantially relative velocity includes velocity of the seeds and the moving surface of metering system of the seeding apparatus being relatively slightly slower or slightly faster than each other.

The invention also provides a seeding apparatus for providing single seed placement from a continuously moving apparatus in a predetermined, uniformly spaced array, and the seeding apparatus including a frame integral with or attachable to a vehicle; a drum means mounted on the frame and having a cylindrical peripheral wall with a predetermined arrangement of a plurality of apertures; drum rotation means for rotatably mounting said drum means on said frame with the axis of said drum means extending substantially horizontally; a vacuum generating means connected with said drum means and operatively communicating with said apertures to provide a vacuum suction through the apertures; receival hopper means mounted on the frame for receiving seed and communicating with a feeding system mounted alongside the drum and having an acceleration means for feeding seed from the receival hopper to the external surface of the drum means at a speed; and a release mechanism for countering the hold of the vacuum suction on the seeds; whereby as the drum rotates the seeds from the hopper means are held against the apertures by the reduced pressure and are carried on the peripheral wall of said drum means from said hopper means to the release mechanism whereat the seeds are released into the seedbed. The seeds can be released at the release mechanism and fall straight down to the seedbed by gravitational means but they would usually be conveyed from the release mechanism along delivery tubes the ends of which are set to the row spacings required and from which the seeds are released into the seedbed.

The acceleration means for feeding seed from the receival hopper to the external surface of the drum means can be at a speed in a range from less than, to substantially equal to, to greater than the speed of rotation of the surface of the drum means. The upper speed limiting factor is that providing seeds at speed substantially greater than speed of the drum will knock off the attached seeds. The lower speed limiting factor is the effectiveness of the rotary pick up to be able to provide seed to allow fast sowing without limiting the ground speed of the sowing apparatus but preferably the differential should not be greater than 20%. Preferably the speed is substantially the same as the surface speed of the drum.

The acceleration means of the feeding system can be gravitational, mechanical, pneumatic or combinations of any of the above.

An example of a gravitational system is a gravity accelerator including a flow control valve at the top of a substantially vertical acceleration chamber with a flow restriction means providing seed density and speed control at the bottom of the chamber thereby presenting seeds as required at the moving drum surface.

An example of a mechanical device can be one or more belts frictionally engaging the seed with the belt speed controlled relative to the drum surface speed.

An example of a combination would be the seeds are first accelerated by gravity and then these moving seeds are presented to the moving belt/s which control the speed of the seeds by accelerating them or acting as a braking system to give the required presentation speed at the point of contact with the drum surface. In one form there are one or more belts frictionally engaging the seed with the belt speed controlled relative to the drum surface speed.

In other mechanical forms the belts can be replaced by speed controlled driven rollers or a velocity controlled flap that alters aperture to give the required presentation speed.

In another form the acceleration means can be an air jet for blowing seed out along a close circumferential or tangential path at a speed substantially equal to the drum means rotation speed.

The feeding system can be mounted on the same diametrical side as the release mechanism or aligned at a circumferential spacing.

The release mechanism can be a mechanical or pneumatic (air jet) deflection system. In one form the deflection system is a frictional brush system externally of the drum means or can be a vacuum cut-off means operating internally of the drum means such as a roller. The drum can have on its surface or be constructed of material which enhances its ability to accelerate and capture seeds thereon.

The release mechanism can provide a release before at or beyond the vertical tangent of the drum means to ensure a diversion of the released seed away from a vertical fall to form a metered seed release trajectory. The point of release can be anywhere after the trajectory of the unmetered seed is established. The object of the release mechanism is to form a second distinct separate trajectory for the selected metered seeds. It is therefore possible using a smaller diameter drum rotating clockwise to establish an unselected seed trajectory originating from the 2 o'clock tangent. This then can provide a release point before the vertical tangent. The material which is not metered by vacuum contact with the drum means forms the unselected particle trajectory. This trajectory can lead to a recycle means in which the unselected particles are returned to an input of the system such as the receival hopper.

The metered seed sent on the metered seed release trajectory can be further controlled by an adjustable venturi system to control an exit speed of seeds. The venturi does not control the number of seeds but can vary the flow speed of the seed inside the delivery tubes. The exit speed can be controlled such that the exit speed is substantially opposing the speed of the vehicle on which the seeding apparatus is loaded to provide a relatively stationary deposit of the seeds.

The present invention can use a rotating perforated drum containing an internal partial vacuum or area of considerably lower pressure than the atmospheric pressure on the outside to attach seeds onto the apertures on its outer surface at high rotational speeds. This is achieved by accelerating the seeds and presenting them at a particular section of the drum travelling at or near the same speed and travel direction as the apertures on the outside surface of the drum, resulting in considerably increased sowing machine ground speeds.

The invention also provides a method for introducing the seeds into the soil at speeds (previously unattainable by ground contacting seeding machines) as well as the controlled venturi release of seeds.

It can be seen that the invention overcomes the restrictions of the prior art by applying the principle that when two or more objects are travelling next to each other in the same direction and at the same speed they will appear stationary relative to each other irrespective of their speed relative to a separate stationary object. Therefore it follows that accelerating the seeds so that at a given point in the rotation of the drum surface they travel in close proximity to and in substantially the same direction and speed as the apertures on a drum surface the seeds will be picked up as if both seed and aperture are stationary relative to each other. As absolute vacuum is the maximum theoretical adhesion pressure available a situation will eventually be reached where the force from the rotation of the drum will be greater than the force holding the seed onto the surface. However using the inventive method described rotational speeds far greater than those used on present seeding machines will be attained.

The resulting invention allows placement of individual seeds within each row at a selected spacing together with the ability to space multiple rows each at a selected distance apart, both these being variable and easily changed. The interrelationship between the aperture spacing within a row on a drum surface, and the spacings between the rows determined by the positioning of the delivery tube exits, and the rotating drum surface speed, and the ratio of the ground forward speed to the drum surface speed—all these factors being variable—provides numerous sowing grid options. The size of the aperture also being variable between interchangeable drums allows for a numerous number of seed varieties to be sown with this apparatus.

Also the invention provides an apparatus which can place predominantly individual seeds at considerable speed. This apparatus would be beneficial in the pursuit of increased yields by enabling the selection of a sowing grid pattern which gives the plant population outcome required for a particular crop.

For example if established for a particular wheat variety grown under irrigation and with a seed germination rate of 95% that a plant population of 400 plants per square meter consistently gave the highest yields then this plant population would be the desired outcome when sowing. In one arrangement of the invention substantially precise placement results in a grid spacing of 50 millimeters by 50 millimeters to give each plant an equal area and therefore opportunity to realise its maximum yield potential on a great proportion on the micro level and therefore maximum yield on the macro level.

Less competition for root space, nutrients, moisture and light from neighbours all contribute to an increase in yield made possible through vigorous early growth of seedlings in the crop establishment phase. This results in earlier ground cover with the shading by crop leaves slowing soil moisture loss from sun and wind as well as smothering weed development. All these factors are known to seriously affect yields.

An apparent inventive or innovative step which is the main differentiating aspect of this apparatus and which sets it apart from any prior art is the prior acceleration of the particles so that they are travelling in the same direction and substantially at the same velocity as the surface of the metering mechanism at the point where they arrive at the moving surface of the metering mechanism and thereby enabling to substantially increase the speed at which seeds can be accurately planted compared to existing ground contact seeding machines.

As to date there has not been an apparatus which could sow seed at the ground speeds obtainable with this invention. Other aspects which are part of the overall apparatus and are original in their application include:

1. The use of electronic sensor device to establish particle exit velocity from delivery tubes providing the ability to control the exit velocity.
2. The use of venturis with controlled adjustable outputs to vary the exit velocity of particles.
3. The use of electronic sensor device to count seeds as well as tube blockage monitoring.
4. The use of electronic sensor to control seed exit velocity so that seeds can be shot into the less dense soil to a predetermined depth.
5. The use of a roller to prevent seed bounce.

All of the above are original applications which have to date not been used nor required on slow moving seeding machines and as such are novel in their application.

It should be noted that accelerators based solely on mechanical, pneumatic or gravitational means, whilst being part of the general concept, are on their own generally difficult to use as their settings would continuously have to be altered for changes of drum speed which moves relative to the ground speed of the machine.

A combination of gravity and mechanical would therefore seem to give the best overall results and is very practical to implement.

BRIEF DESCRIPTION OF THE DRAWING

In order that the invention can be more readily understood embodiments of the invention will be described by way of illustration only with reference to the drawings wherein:

FIG. 8 is a partial cross sectional view of a gravity feed system to a drum metering means with a speed control driven belt feed system controlling particle velocity feed to the drum in accordance with a fifth embodiment of the invention;

FIG. 9 is a partial cross sectional view of a gravity feed system to a drum metering means with a speed control double belt drive feed system controlling particle velocity feed to the drum in accordance with a sixth embodiment of the invention;

FIG. 10 is a partial cross sectional view of a gravity feed system to a dual drum metering means with a speed control double belt drive feed system controlling particle velocity feed to the dual drums in accordance with a seventh embodiment of the invention;

FIG. 11 is a partial cross sectional view of a gravitational accelerator feed system in accordance with an eighth embodiment of the invention with the gravitational accelerator including a particle velocity control flap providing adjustable aperture output feeding;

FIG. 12 is a partial cross sectional view of a gravitational accelerator feed system in accordance with a ninth embodiment of the invention with the gravitational accelerator including a redirecting slide and a particle velocity control driven roller;

FIG. 14 is a partial front elevation of a seed metering drum of a seeding apparatus in accordance with the invention;

FIG. 15 is a partial cross sectional view of the seed metering drum of FIG. 14;

FIG. 19 is a cross section of a seed metering drum with a continuous belt sealing a majority of the drum except the metering segment of the drum;

FIG. 20 is a cross section of a seed metering drum with a hollow sleeve used to block apertures which are not in the metering segment of the drum thereby concentrating suction in the metering segment of the drum;

FIG. 21 is a cross section of a seed metering drum with a flexible stationary belt sealing a majority of the drum except the metering segment of drum;

Figure 1:
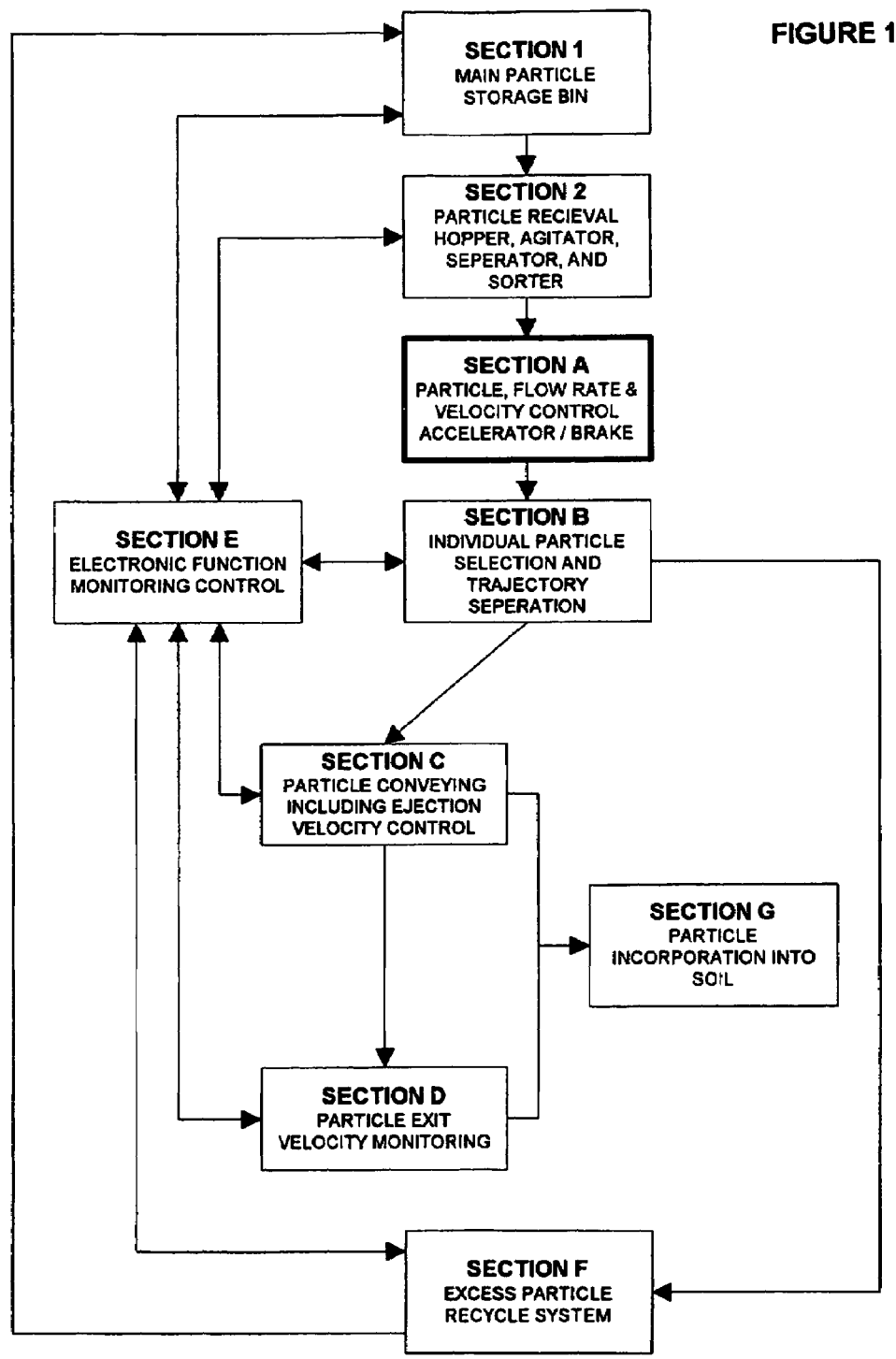
FIG. 1 is a schematic block diagram showing conceptual interengaging functions on a seeding apparatus in accordance with embodiments of the invention.

Throughout the drawings constant numbering is used to represent the same feature in different embodiments. The full listing of features identified by numbers is as follows:

1. Seed metering drum.
2. Drum support bearing and vacuum seal housing
3. Apertures in drum surface within a row
4. Rows showing offset apertures
5. Drum support frame
6. Vacuum or suction generating mechanism
7. Drum rotation mechanism
8. Apertures with metered particles attached
9. Vacuum cut off particle ejection roller
10. Air jet blockage cleaner and ejection mechanism
11. Particle trajectory separation area
12. Blockage in aperture
13. Blockage cleared
14. Particle trajectory separation guides
15. Trajectory of metered particles
16. Trajectory of unselected particles
17. Direction of drum rotation
18. Air jet particle ejection nozzle
19. Air jet
20. Rotating brush particle ejector
21. Direction of brush ejector rotation
22. Adjustable mechanical deflection particle ejectors
23. Deflected & ejected metered particles
24. Metering segment of drum
25. Vacuum restricting wedge
26. Belt idler roller
27. Continuous belt used to block apertures which are not In the metering segment of the drum thereby concentrating suction In the metering segment of the drum 24. The belt Is sucked onto the drum surface and Is driven by the rotation of the drum.
28. Continuous belt tension roller
29. Sleeve used to block apertures which are not in the metering segment of the drum thereby concentrating suction in the metering segment of the drum 24. The sleeve can be hollowed internally so only the perimeter of Its under side contacts the drum thereby minimising drag.
30. Main storage bin for particles
31. Receival hopper for particle feed system
32. Agitator to assist flow of particles in feed system
33. Means for transferring particles from main bin to receival hopper—may be mechanical such as auger, conveyor belt or pneumatic system
34. To particle velocity control section
35. Shut off valve
36. Particles—seeds
37. Particles in gravitational flow
38. Particle velocity control flap—adjustable gap
39. Particle velocity control driven roller—adjustable rotational direction, velocity and gap
40. From gravitational acceleration section
41. Particle velocity control continuous belt
42. Particle velocity control continuous belt idle roller
43. Particles which already have momentum
44. Particle slide guide
45. Particle flow rate control adjustable valve
46. From receival hopper
47. Gravitational acceleration chamber
48. Particles undergoing gravitational acceleration
49. Slide segment on a gravitational accelerator
50. Stationary belt used to block apertures which are not In the metering segment of the drum thereby concentrating suction in the metering segment of the drum 24.
51. Particle flow restrictor used to provide constant pressure of particles on the control valve 45 as the height of particles in the receival hopper changes
52. Area of constant pressure under restrictor 51 providing constant flow to control valve 45

53. Ground roller—press wheel
54. Sprung tynes—ground ticklers—height and action adjustable
55. Air dissipation area in which excess air pressure from delivery tube dissipates
56. Particle delivery tube
57. Particles shot under roller to prevent particle bounce
58. Soil which has been lifted by ticklers 54 and has air mixed in making it less dense than soil below
59. Ground level
60. Particle to soil incorporator support frame—height adjustable
61. Particles shot Into strata containing less dense soil
62. Venturi—flow rate adjustable
63. Pressure adjustable air nozzle into venturi enabling velocity control of particles in delivery tube
64. Suction inlet section of venturi accepting meter particles
65. Venturi outlet transferring metered particles into delivery tube
66. Electronic sensor—various functions some examples being particle counting, particle velocity monitoring and delivery tube blockage monitoring
67. Particle metering drum hollow support axle
68. Particle metering drum support bearing and vacuum seal
69. Particle metering drum drive gear or sprocket
70. Unselected or non metered particle recycle system—mechanical or pneumatic means
71. Area of low pressure within particle metering drum
72. Spring tension on vacuum cut off roller 9
73. Particle velocity control belt drive roller
74. Evenly spaced metered particles
75. Area at which particle flow rate is controlled
76. Area at which particles arriving with momentum are arranged prior to final velocity control
77. Area where particles which have been velocity controlled arrive at metering drum moving surface

DESCRIPTION OF THE PREFERRED EMBODIMENT OF THE INVENTION

Referring to the drawings there is shown a method of seed distribution using a mobile ground engaging seeding apparatus including a moving metering system having a moving part of which the movement assists metering of seed to be distributed. FIG. 1 of the drawings shows the overall system broken down into a number of sections in a diagrammatic form.

In FIG. 1 there is shown a seeding apparatus that includes a main particle storage bin as detailed by Section 1. Material passes to a particle receival hopper, agitator, separator and sorter as categorised in Section 2. The system is then broken down into 7 sections with Section A comprising the particle, flow rate and velocity control means with accelerator and braking components. Section B receives the particles at controlled velocity and selection of the individual particles together with trajectory separation occurs. The non selected particles enter the excess particle recycle system of Section F to return to the main particle storage bin of Section 1. However the selected particles on a trajectory from Section B proceed to the particle conveying means of Section C including ejection velocity control means. Section D monitors particle exit velocity and the particles proceed to Section G where the particles are incorporated into the soil. Section E is an electronic function monitoring control which monitors and controls various elements of Sections 1 and 2 as well as Sections A, B, C, D, F and G.

The description will particularly describe one embodiment of an entire system and then provide examples of some variations of each section.

Figure 3:
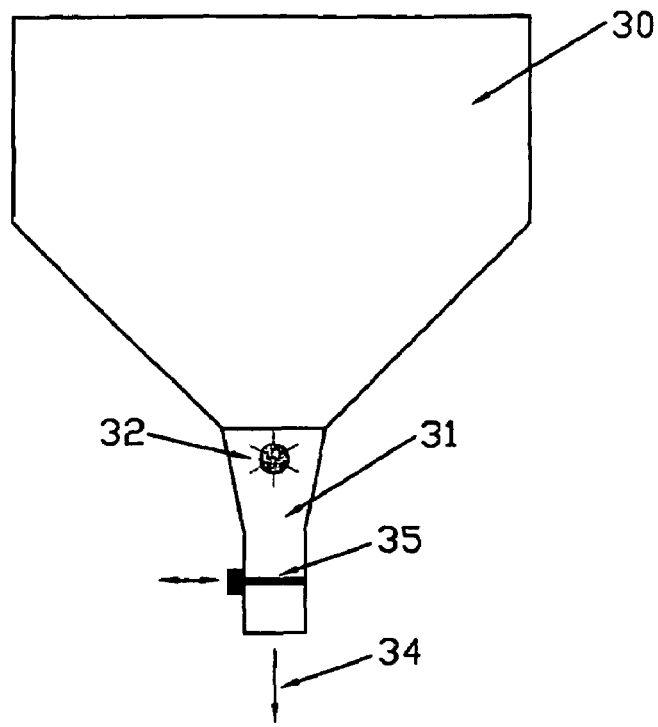
FIG. 3 is a partial cross sectional view of a main particle storage bin of one form of Sections 1 and 2 of seeding apparatus of FIG. 1 with a receival hopper fed by gravity.
Figure 4:
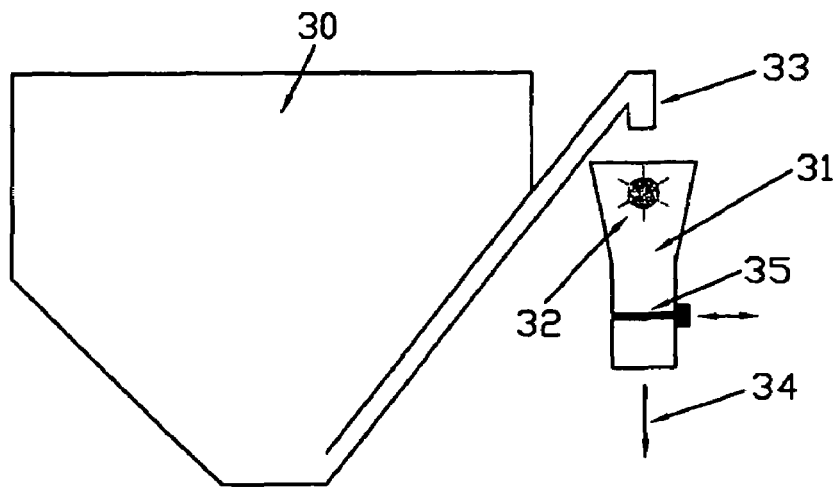
FIG. 4 is a partial cross sectional view of a main particle storage bin and adjacent receival hopper of a second form of Sections 1 and 2 of seeding apparatus of FIG. 1 with the receival hopper supplied by a auger or the like from the main storage bin.

FIGS. 3 and 4 relate to options of Sections 1 & 2 of FIG. 1. FIG. 3 shows a main storage bin with a receival hopper fed by gravity situated below while FIG. 4 shows a receival hopper supplied from a separate main storage bin.

The system includes a feed system for providing seed from a seed reservoir to the moving metering system, the feed system providing substantial control of speed and amount of seed to be able to effectively interact with the moving metering system. The seed to be distributed is fed to a particle receival hopper, agitator, separator, sorter and accelerator. These will be further described in Section A which in various embodiments is shown in FIGS. 5 to 12.

The material is fed to an individual particle selection and trajectory separation. The moving metering system has a drum with a series of holes each smaller than the seeds and an internal negative pressure such that rotation of the series of holes and suction of the seeds to the drum provides a metering of the seed. This will be further described in Section B and shown in various forms in FIGS. 13 to 20. The feed system provides seed at substantially stationary relative position between the seed from the feed system and the moving surface of the metering system. The feed system further has an acceleration means for feeding seed from the feed reservoir to the external surface of the drum means at a speed substantially equal to the speed of rotation of the surface of the drum means.

As will be further described in Section C, a delivery means is provided for delivering the metered distribution of seed and having a delivery mechanism which substantially controls the speed and direction of the seed such that the metered seed is delivered substantially as metered. The feed system provides seed to the moving metering system on a circumferential side of a rotationally moving metering system providing selection and metering of seed to the delivery system.

The metered material has its exit velocity monitored and controlled to be seeded at required spacing. This will be further described in Section D.

Figure 22:
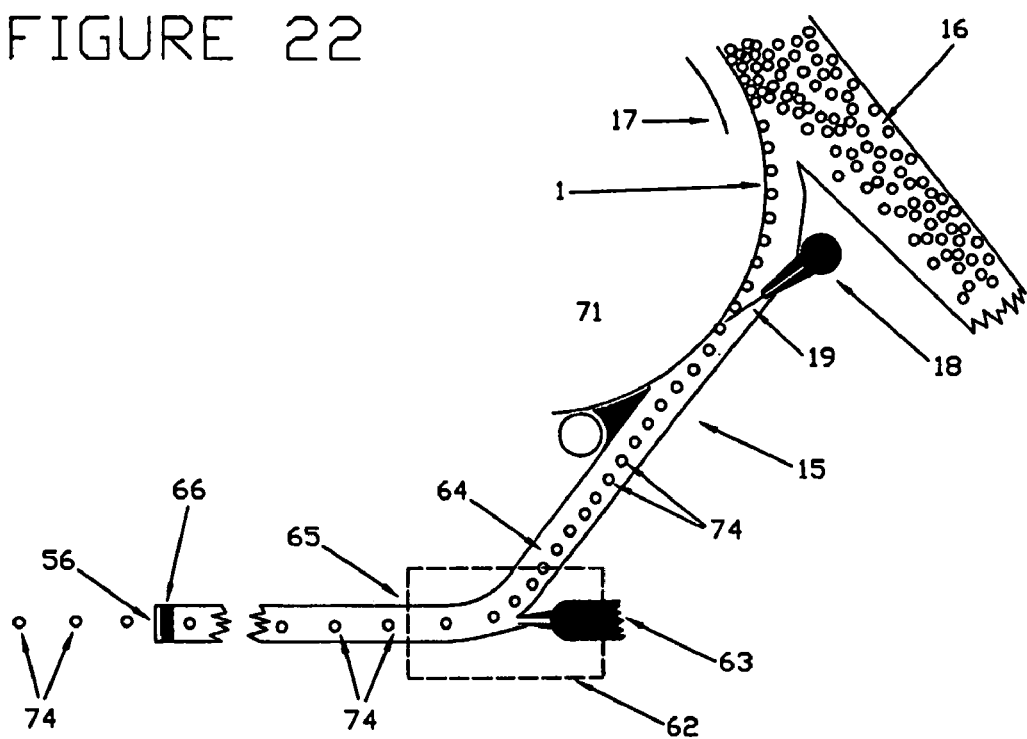
FIG. 22 is a cross section of an airjet release mechanism of the drum metering means and a delivery system having an ejection velocity control system using an adjustable flow venturi in line with an outlet delivery tube.
Figure 23:
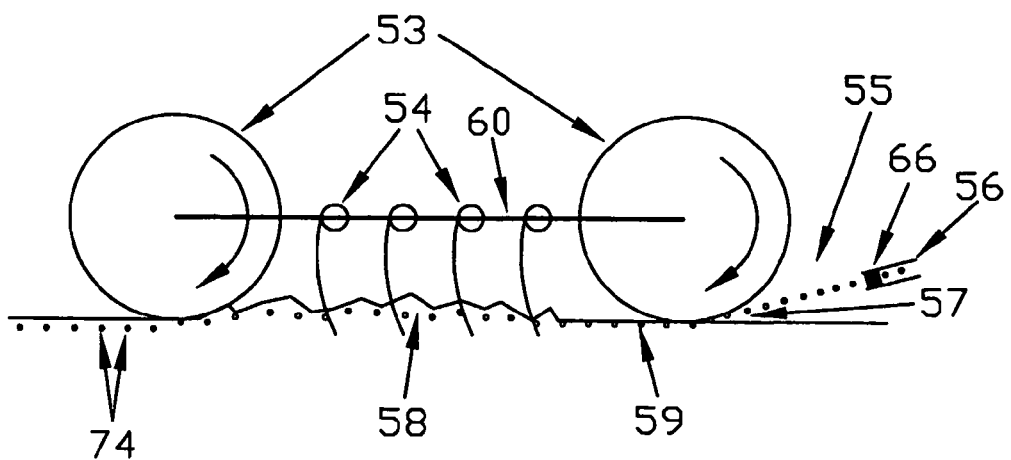
FIG. 23 is a cross section of a means of incorporating metered particles into the soil including dual rollers and resilient tynes therebetween.
Figure 24:
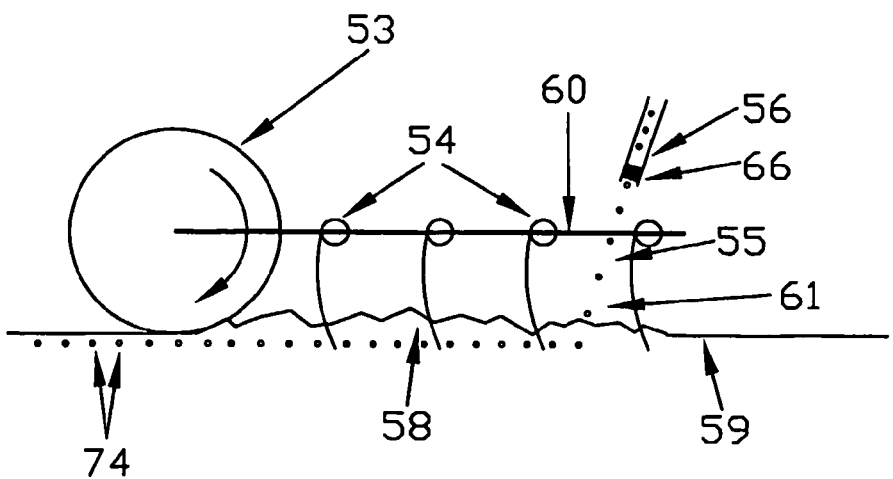
FIG. 24 is a cross section of a means of incorporating metered particles into the soil including a single roller and preceding resilient tynes.

The incorporation of the seed into the soil will be further described in Section G and with reference to FIGS. 22 and 23.

The control is undertaken by electronic function monitoring control as will be further described in Section E.

The excess that is not picked up is collected by the excess particle recycle system and returned to the main particle storage bin. This will be further described in Section F.

Figure 2:
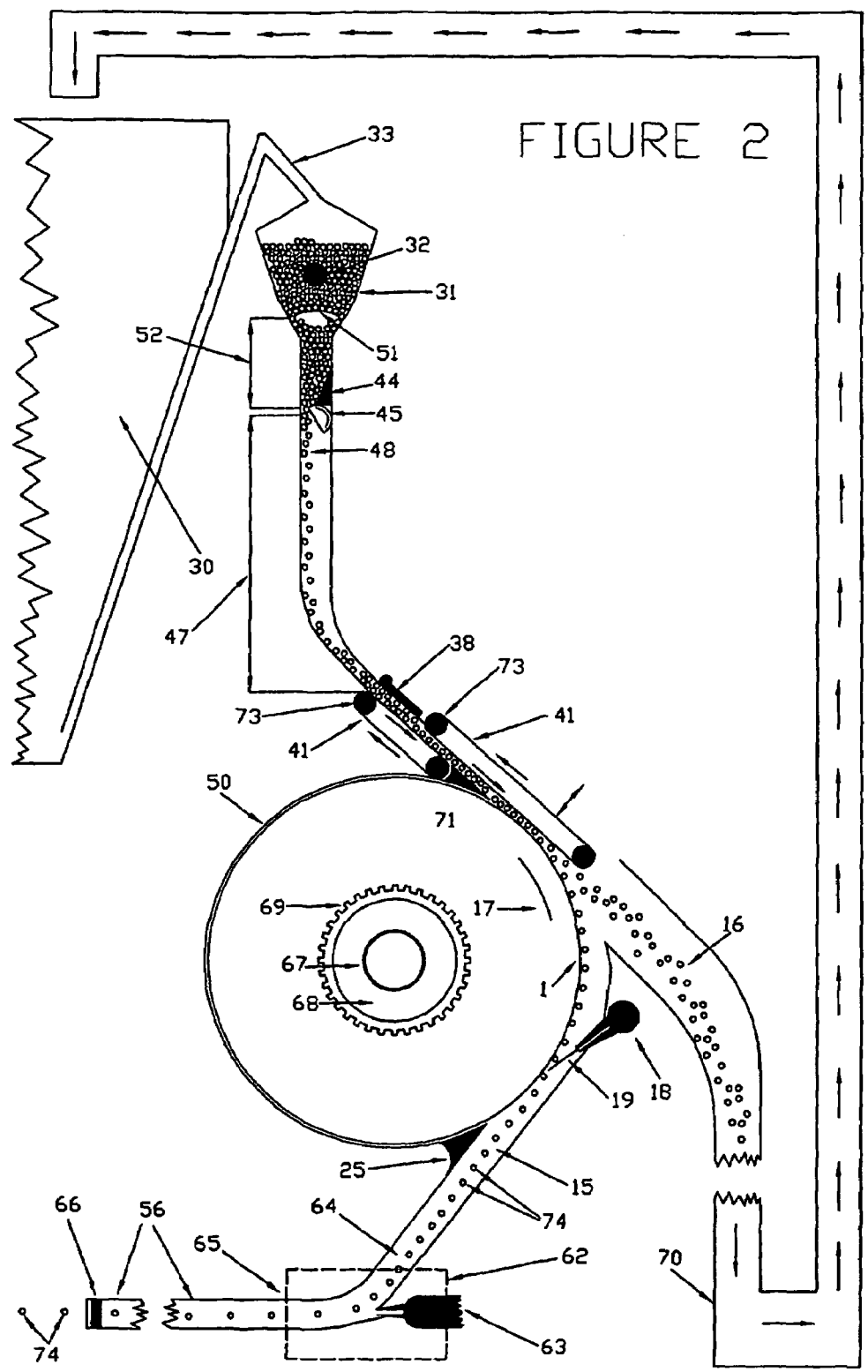
FIG. 2 is a schematic cross sectional view of a combination gravitational and mechanical feeding means to drum metering means of a seeding apparatus in accordance with a first embodiment of the invention.

However FIG. 2 provides one example of an overall diagrammatic cross-sectional view of a seed distribution method and apparatus in a preferred embodiment showing sections A, B, C, D, and F. This embodiment of the invention shows one from the range of options available for metering and distributing seed. The apparatus provides metered seed placement from a continuously moving vehicle in a predetermined, uniformly spaced array and allows for recycling of unselected seeds.

The seeding apparatus includes a frame integral with or attachable to a vehicle. A seed distribution metering means for metering the seed to be distributed is mounted on the frame and includes a seed metering drum I mounted on the frame with a circumferential cylindrical peripheral wall and having a horizontal axis of rotation around a hollow support axle 67. A drive gear 69 drives the rotation of the drum 1. The drum 1 has a predetermined arrangement of a plurality of spaced apertures 3 smaller than the size of the seed to be metered. The drum 1 is connected to a vacuum generator 6 providing area of low pressure 71 in an annular area between the hollow support axle 67 and the circumferential cylindrical peripheral wall of the drum 1. The hollow drum 1 is supported by the hollow axle 67 which simultaneously provides the connecting channel by which low pressure vacuum is applied to the drum 1. A drum bearing and seal 68 separate the annular area of low pressure 71 from the hollow support axle 67 and allow drum rotation around the stationary axle. A means 25 and 50 on the outer side of the circumferential cylindrical peripheral wall partially seals the outer side of the drum 1. A drum rotation means is thereby provided for rotatably mounting said drum means on said frame and for rotating the drum at a required speed. The vacuum generator for generating a negative pressure is fluidly connected with said drum and operatively communicating with said apertures to provide a vacuum suction through the apertures.

A receival hopper 31 is mounted on the frame above the drum 1 for receiving and holding seed for distribution. The receival hopper is fed from a main storage bin alongside by a transferring means 33 extending from a lower portion of the main storage bin 30 to an upper side of the receival hopper. The transferring means can be a rotating auger or other means. An agitator 32 is located within the receival hopper 31 to provide a rotating, vibrating action or both to prevent blockages and ensure smooth flow of seeds. A particle flow restrictor 51 is provided in a lower section of the funnelling receiving hopper 31 in order to provide a broad control of feeding of seed. The particle flow restrictor 51 provides an area 52 of constant pressure and feeds the seeds to an outlet chamber of the feeding system for feeding seeds from the receival hopper to the external surface of the drum 1. An adjustable flow rate control valve 45 at the top of the acceleration chamber 47 meters seed to give an amount of seeds and at the correct density required for a particular drum surface rotational speed.

This outlet chamber forms a gravitational acceleration chamber 47 which is the acceleration means corresponding to Section A for feeding seed at a required speed relative to the speed of the drum 1 and the speed of the seeding vehicle. The acceleration segment 47 of the accelerator means comprises a first gravitational drop portion which is of sufficient predetermined height to provide the required acceleration of particles from stationary to a higher velocity. The acceleration segment 47 also includes an angled slide segment 49 for redirecting the seed to a path across a portion of the circumferential cylindrical peripheral wall of the drum 1. At the end of the slide there is an adjustable particle velocity control flap 38. The interaction between the flow rate control valve 45 and the particle velocity control flap 38 enables seeds which have gained momentum to be presented at the moving drum surface at the density and speed required. Section A also includes a velocity control means which in this form includes two particle velocity control continuous belts 41 that are spaced on either side of the flow path adjacent the expected engagement of the seeds with the drum 1. The spacing and the rotation of the continuous belts 41 by the drive rollers 73 can be altered to alter the speed of the seed and spacing of the seed to ensure maximum effectiveness of the seed metering drum 1. The drive rollers 73 can be independently driven or driven mechanically off the drum 1.

The rotating drum l with a series of holes located on the circumferential cylindrical peripheral wall and which are each smaller than the seeds and an internal negative pressure in the internal annular area 71 of the drum causes rotation of the series of holes and suction of individual seeds to individual holes of the drum 1 to provide a metering of the seed The increased effectiveness of the internal low pressure 71 is provided by a means on the outer side of the circumferential cylindrical peripheral wall which partially seals the outer side of the drum 1. This is provided by a stationary flat belt 50 fitting around the outer surface of the drum 1 away from the metering portion to minimise vacuum suction required. The flat belt 50 is retained adjacent the drum by the suction pressure applied through the perforations and is of material to minimise drag caused by the drum's rotation. This belt is used to block the drum perforations on a large part of the circumference thereby reducing the size and volume of the vacuum generating mechanism required.

Wedges 25 are used to block unused perforations on the drum, which has the same function as flat belt 50. The use of belt and wedges assist in concentrating and maximising the suction effect produced by the partial vacuum inside the drum onto the seed separation section and also results in not having to use as large a fan or vacuum pump for a given drum size.

A release mechanism 18 is incorporated for countering the hold of the vacuum suction on the seeds, whereby as the drum 1 rotates the seeds from the hopper means are held against the apertures by the reduced internal pressure of the drum 1 and are carried on the peripheral wall of said drum means from said hopper means to the release mechanism whereat the seeds are released into delivery system of Section C to the seedbed. The release mechanism is located along a circumferential portion around from the metered section such that the detachment of seeds from the circumferential cylindrical peripheral wall of the drum forms a metered seed trajectory 15. In the embodiment shown there is a positive pressure air jet nozzle 18 at this circumferentially spaced position from the metered position with the nozzle 18 directing an air jet 19 to eject metered seeds 74 off the drum outer surface along the trajectory of metered particles 15.

There is also a recycle means 70 for unmetered seeds following a trajectory 16 separate to the metered/separated seeds trajectory 15 as they were not held by the lower pressure 71 to the holes on the drum outer surface and redirected on the circumferentially offset trajectory but instead continued in the substantially straight trajectory provided by the acceleration means and velocity control means. The recycled seeds are returned back to the main storage bin 30.

In one form the selected metered particles 74 following the trajectory 15 enter suction inlet section 64 of venturi 62 and by pressure adjustable air nozzle 63 leading into venturi 62 provide at the venturi outlet 65 seeds at the required velocity to proceed along particle delivery tubes 56 past electronic sensors to the seedbed so that there are evenly spaced seeds 74 leaving the seeding apparatus. Control of the seeding can be adjusted by the electronic function monitoring control of Section E to give relative stationary placement of seeds. Flexible tubes, one per row, allow for row spacings to be adjustable.

However to further understand the seed distribution method and apparatus it is necessary to separately look at various sections in detail and show some of the proposed variations.

Sections 1 and 2: Particle Storage and Feeder

As shown in FIGS. 2, 3 and 4 a receival hopper 31 is located above the drum means 1 and receives the seeds from a main storage bin 30. This is achieved by gravity when as in FIG. 3 the receival hopper 31 is placed below the main storage bin 30. However as shown in FIGS. 2 and 4 the seed can be transferred by pneumatic or mechanical means if the receival hopper 31 is located next to the main storage bin 30. This allows for the height of the seeding apparatus to be limited. It also allows for the receival hopper to be adjustable in height to allow for different distances and greater gravitational acceleration of seed between leaving the receival hopper 31 and encountering the drum 1. In some cases when the particles are of a type which do not flow freely under gravity, the assistance of one or more agitating mechanisms 32 may be required to induce flow and prevent clogging. The agitation can be a vibrating apparatus or as shown a rotating mechanism or combination of these. The agitator provides an even uninterrupted supply of seeds to the feeding system.

Section A Particle Flow Rate and Velocity Control

FIG. 5-13 relate to Section A of the block diagram of FIG. 1. Section A primarily concerns a number of functions in preparing the particles prior to their presentation at the drum surface of Section B.

An accelerator is required to accelerate the stationary particles from the feed hopper 31. The accelerator can be mechanical, pneumatic or any other means to give the desired outcome of accelerating the particles to a speed substantially the same and in the same direction as the rotational speed of the drum surface. The particles may travel slightly slower or slightly faster than the drum surface. If the speed differential is too large the drum will fail to pick up seeds. If the particle speed is too slow the drum will fail to pick up seeds—this being the limitation of the prior art. Seeds already selected will be knocked off by those travelling past at a rate which is too fast.

Figures 5, 6:
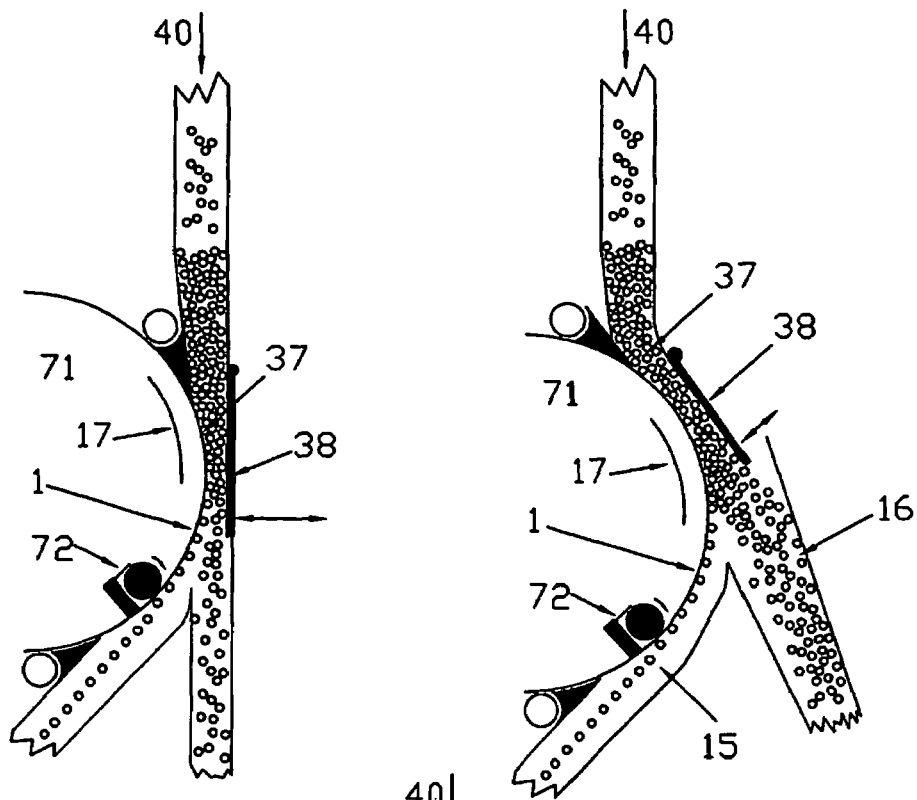
FIG. 5 is a partial cross sectional view of a gravity feed system having vertical feed with particle velocity control flap providing adjustable aperture feeding to a drum metering means in accordance with a second embodiment of the invention.
FIG. 6 is a partial cross sectional view of a second gravity feed system having vertical feed redirected across the drum with particle velocity control flap providing adjustable aperture feeding to a drum metering means in accordance with a third embodiment of the invention.

FIG. 5 shows a gravity induced free fall system 40 which can be suitable for some types of particles to accelerate seeds vertically past a circumferential surface of a rotating drum 1. FIG. 6 shows a variation of a gravity feed system which exposes seeds to an increased section of the drum surface to enhance the likelihood of connection of seeds to the holes of the circumferential surface of the drum by the internal lower pressure 71. The greater possible drum contact surface also allows for faster rotation of the drum.

Figure 7:
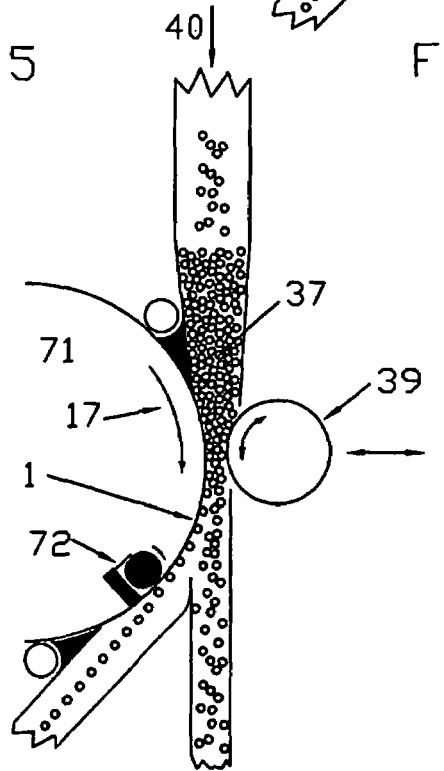
FIG. 7 is a partial cross sectional view of a gravity feed system to a drum metering means with a speed control driven roller controlling particle velocity feed to the drum in accordance with a fourth embodiment of the invention.

FIG. 7 shows the addition of an adjustable direction and variable speed driven roller 39 to assist flow and control seed velocity on a gravity feed system. The adjustable accelerator roller 39 can accelerate or decelerate the particles as required. Further this arrangement also allows gap adjustment between the roller 39 and the drum 1 and speed variation to produce the required outcome. The driven roller 39 can be rotated clockwise or anticlockwise. When the gap between drum 1 and roller 39 becomes small the roller may tend to compress and damage seeds if travelling in the anticlockwise direction. In extreme cases blockages and jamming may result. By reversing the directional rotation of the roller 39 to clockwise it will tend to prevent blockages as well as controlling the speed of the seeds between it and the drum surface. Having this bi-directional facility in creases the range of options available.

FIG. 8 shows an adjustable variable speed single continuous belt 41 to assist flow and control seed velocity on a gravity feed system. A single vertical moving continuous belt 41 extending around drive roller 73 and idler roller 42 is located on one side of a gap formed by the drum surface on one side and the belt on the other. The size of the gap between belt 41 and the metering surface of the drum 1 assists in the acceleration or deceleration of the particles as they pass. The belt 41 need not only be an accelerator but can be a braking system if required when the flow speed induced by gravitational free fall of the particles is greater than required. The belt simply by travelling at a slower speed will have frictional effect on the flow forming a braking effect to provide the correct particle speed.

FIG. 9 like FIG. 10 show adjustable variable speed double continuous belts 41 to assist flow and control seed velocity on a vertical gravity feed system. The seeds are moved between two moving belts so that the seeds are frictionally engaged by the belts and thereby accelerated or decelerated. The gap between the belts and the belt speed are adjustable. The belts can be flat, contoured or shaped or coated in a way to provide the desired outcome.

FIG. 10 shows one arrangement of a multi drum system with seeds arriving from between adjustable variable speed double continuous belts 41 to assist flow and control seed velocity on a gravity feed system. This is an example of a multiple drum system which can be used to increase the sowing width of a seeding apparatus or where small spacings between seeds are required at higher sowing speeds. Another option would be to place drums above one another or multiples of both arrangements.

FIG. 11 shows a gravitational accelerator used to give the seeds initial momentum and to control flow rates while FIG. 12 shows the addition of a redirecting slide as part of the gravitational accelerator. The figures show slight conceptual variations in that the acceleration device in FIG. 12 can be moved up and around the drum to a different location to allow non vertical contact of the seed with the drum. This allows for the spray pattern of the excess non selected particles to be guided away rather than straight down as well as increasing the area on the drum surface where seeds are selected as shown in FIG. 2.

At the end of the gravitational accelerator of FIG. 11 there is an adjustable particle velocity control flap 38 which allows the seed to maintain momentum while acting as a braking means to control both the density and speed of the seeds to be presented to the drum surface. The interaction of the flow rate control valve 45 and the flap 38 enables the precise control of the seed density and speed. The same function is performed in FIG. 12 by an adjustable particle velocity control driven roller 39.

The function of the accelerator is to accelerate the seed so that when presented at the drum surface as will be described in Section B the seeds will be travelling in the same direction and preferably at the same speed as the drum surface where both make contact. Ideally the seeds should travel at slightly slower than the drum surface thus compensating for misalignment of aperture and seed. If the seeds are travelling too much faster than the drum apertures they will knock attached seeds off as they travel past. In FIGS. 5 to 10 it can be seen that the moving drum surface in itself provides acceleration assistance by both the action of the moving suction pressure on the particles and also by being a moving floor.

The hopper, agitator and accelerator ideally have the dimensions so that seeds will be presented to the drum surface evenly but adjustably and across the required drum width. Typically the width of the feeding system shall be similar to that of the drum means.

Figure 13:
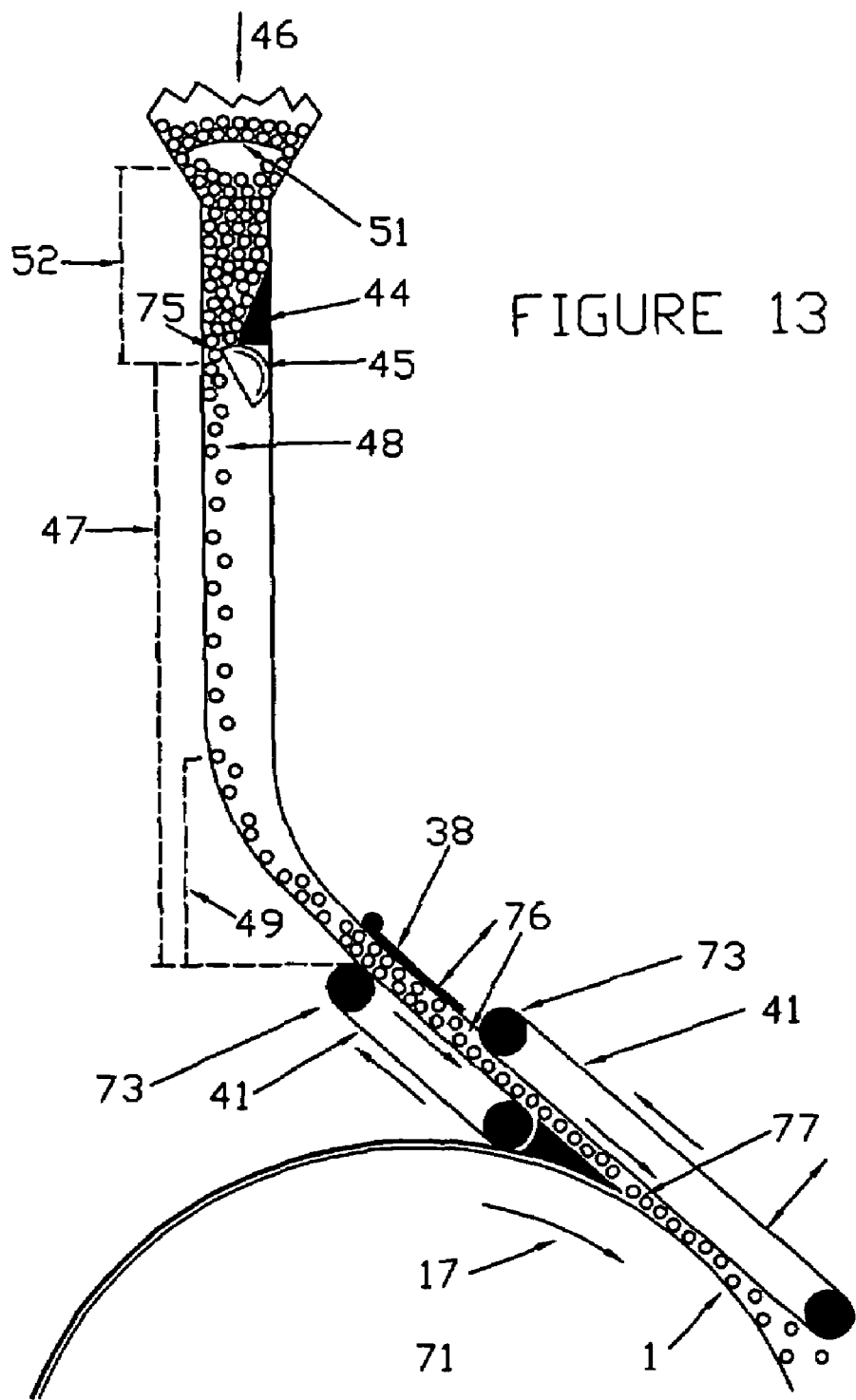
FIG. 13 is a partial cross sectional view of another gravity feed system in accordance with a tenth embodiment of the invention with the gravitational accelerator including a redirecting slide and a particle velocity control flap providing adjustable aperture output feeding with a double belt seed velocity control section.

FIG. 13 shows an acceleration system having a gravitational acceleration section 47 and a redirecting slide 49 feeding seeds into a double belt seed velocity control section. The angle of redirection is the tangent to the drum at the metering drum moving surface 77 beginning at around about 2 o'clock on the drum 1. This is different to the other examples in FIGS. 5 and 7 which are vertical feed to drum metering surface 77 at 3 o'clock. The angle of the redirecting slide 49 allows choice of location of drum metering surface 77.

The gravity acceleration system has a mechanical velocity control system between 47 and 77 attached to vary the velocity and density of the particles so they arrive at the drum surface as required. Like FIG. 11 there is an adjustable particle velocity control flap 38 which allows the seed to maintain momentum while acting as a braking means to control both the density and speed of the seeds to be presented to the drum surface.

At the base of the particle receival hopper 31 is a particle flow restrictor 51 which provides a constant height 52 of particles above the control valve 45 thereby providing a constant feed pressure irrespective of the particle height in the receival hopper 31. A slide 44 helps guide the particle into the area 75 where the particle flow rate is metered. By accurately controlling the opening at 75 with the control valve 45 which maybe driven by a stepper motor as one example, the desired amount of particles arriving at the drum surface 77 is achieved. Ideally the density of the flow of particles arriving at the moving drum surface should be such that no pick up failures occur. If the density is insufficient inter-particle gaps are too large and particle pick-up failures can result. If the density is too large then an excessive amount of unselected particles will have to be recycled from Section F.

The particles accelerate in the gravity acceleration section 47 so they arrive at the mechanical particle velocity control belts at 76.

Setting the height of 47 to that required for the maximum velocity required at the drum surface 77 enables the control of the particle velocity by the belts 41 to be more efficient. As an example setting the height 47 at around 1 meter will result in the particles accelerating to a velocity of about 4.5 m/sec when they arrive at the belts 76. Adjusting the particle velocity control flap 38 gap ensures that the particles orientate themselves to provide the required density and speed on arrival at the metering drum surface 77.

Adjusting the velocity of and the gap between the belts 41 which are driven by rollers 73 and can be accurately controlled gives the ability to provide acceleration, maintenance of velocity or braking action on the particles.

Calculating the weight and density of particles required for a particular metering drum surface velocity gives the flow rate per second of particles required to arrive at the drum moving surface. This flow rate is controlled at 75 by 45.

The slide 49 is provided so that the particles arrive at the mechanical belts section at the same angle as that of the belts that being the tangent to the drum at 77.

As functions including particle flow rate controlled by valve 45, speed of mechanical belts 41, metering drum surface velocity, are all monitored and controlled by section E it is straight forward that the relationship between all these functions can be adjusted to provide the required results.

Section B: Particle Selection, Separation and Trajectory Separation

FIGS. 14-21 relate to Section B of the block diagram of FIG. 1. FIG. 14 shows a seed metering drum with rows 4 of offset apertures on its surface. FIG. 15 shows a partial cross section of a drum with metered seeds being separated from unselected seeds with one example of a separation device together with one example of a blockage cleaner.

Seeds that have been accelerated are presented from the accelerator belt to a rotating drum's outer perimeter at 77 as shown in FIG. 13. The drum perimeter has rows of evenly spaced holes 3 through the surface with hole spacing which may be offset between rows.

The drum contains within it a partial vacuum that is created by an external vacuum generating mechanism connected through axial tube to the drum means. This creates an area of considerably lower pressure within the drum than the external atmospheric pressure. The pressure difference causes the seeds to be held onto the holes on the perimeter of the outer surface of the drum. The holes therefore must be smaller than the seeds to prevent the seeds travelling into the drum itself. By substantially blocking the holes the seeds help to maintain a negative pressure inside the drum as material or air is predominantly prevented from entering the drum to break the partial vacuum or decrease the pressure differential between internal and external pressure. By selecting the correct hole diameter for a particular seed type predominantly only one seed will adhere to each hole and particles will not jam inside a hole.

The drum rotation means can be mechanically driven by a ground engaging wheel or driven by a motor which may be speed controlled. Speed control allows for variation of drum speed relative to the ground speed of the seeder thereby enabling minute variations to be made to the spacing of particles within a row regardless of speed of seeder. This variation is also possible while in operation therefore not requiring stopping and readjusting. Such variations also allows for variation of the optimum seeding density according to localised variations that have been identified from previous harvests. This could be due to sections of better soil types within an area, different moisture availability, leeward side of hill or North facing hill for Southern Hemisphere properties or any other reason.

FIG. 15 shows a vertical cross section of the drum. A vacuum cutoff roller 9 inside the drum 1 releases the selected particle at a set point 11 by cutting off the pressure holding the particle onto the drum outer surface.

Figure 16:
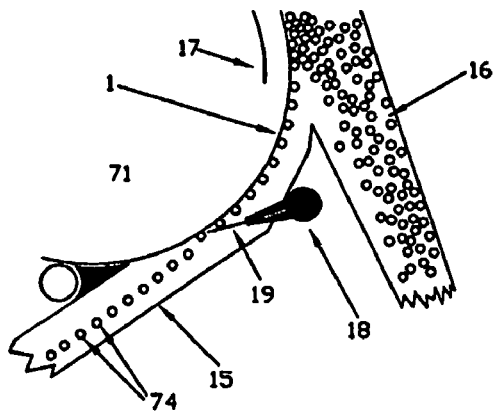
FIG. 16 is a partial cross section of an external air jet form of a separation device for releasing seed from the drum metering means.
Figure 17:
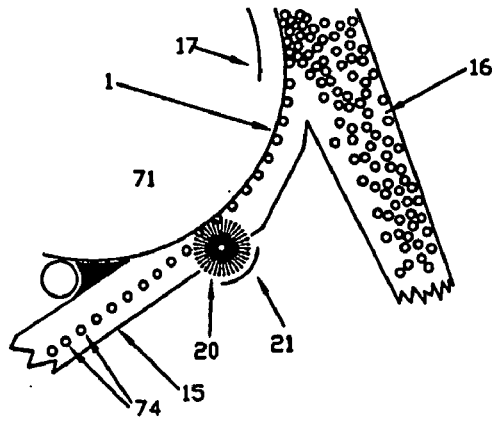
FIG. 17 is a partial cross section of a rotating brush form of a further separation device for releasing seed from the drum metering means.
Figure 18:
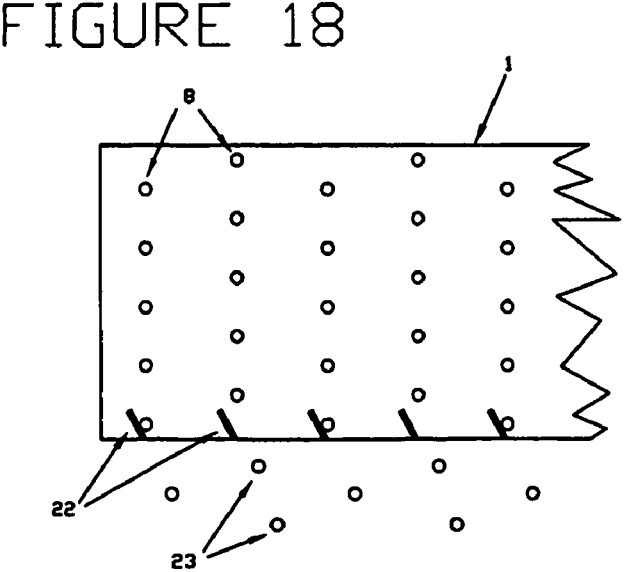
FIG. 18 is a front elevation of a partial view of an adjustable mechanical deflector form of a separation device for releasing seed from the drum metering means.

Also other examples of many available options FIGS. 16, 17 and 18 show additional external methods which may be used to release the selected (metered) particles off the drum surface.

FIG. 15 shows the use of an internal airjet 10 using positive air pressure to clear a blockage 12 and 13. It is used as a backup ejection device when used with 9 or as an ejection device on its own without the presence of 9. The unselected particles fall away under gravity to form a first trajectory being the unselected particle trajectory 16 whilst the selected (metered) particles at 8 are rotated to another point on the drum 11 to be released by 9 to form a second different trajectory being the metered particle trajectory 15 thereby providing accurate separation and metering.

FIG. 16 shows an external airjet 19 from nozzle 18 as a release mechanism.

FIG. 17 shows a further option of a rotating brush used to perform this function. A simple deflection device on the outer surface of the drum is therefore all that is required. FIG. 18 shows the use of adjustable deflectors 22 as another example of a separation device.

The drum in one useful embodiment has a circumference of 1 meter with about 100 holes 10 millimeters apart on each row of the drum perimeter. With a ratio between ground speed and drum surface speed set at 5 to 1, and the drum rotating at about 167 revolutions per minute, a seed is planted every 5 centimeters within a row when the vehicle is travelling at a ground speed of 50 kilometers per hour.

The diameter of the drum can be varied to give the required outcome.

The seeds, which are held onto the outer surface, are separated from the air stream of unattached seeds by the rotational movement of the drum. The unattached seeds continue in the direction initialised by the accelerator in the feeding system while the attached seeds which have been separated from the main stream have travelled around to a position where they are released off the drum's surface. The release of these seeds can be done in a variety of ways including deflection mechanisms on the outer side or by temporarily cutting off the vacuum supply on the inner side of the drum. On separation these seeds will continue to travel off along the tangent at the point of release, which will be a trajectory 15 different to the trajectory 16 of main stream of seeds, which are not attached.

In this way the feeding system and drum system of Section B has provided a mechanism for selecting seeds at regular intervals and separating those selected seeds from the main seed stream thereby accurately metering those separated seeds allowing for the counting and accurate spacing of those seeds. The selected separated seeds continue on to the exit system of Section C while the unseparated seeds in the main stream continue onto the recycling system of Section F.

As the seed stream, which has been accelerated by the feeding system of Section A, can be several seed widths thick it presents two surfaces. FIG. 10 shows one side of this seed stream making contact with one drum surface in Section B. An additional drum placed directly opposite the first and rotating so that it selects seeds from the other side of the stream can be utilised. This means the accelerated seed stream passes between both drums. Furthermore as the unattached seeds in the stream travel onto the recycle system of Section F additional drums can be added below in a vertical tiered format.

The use of multiple drum set-ups can substantially increase a machine's ground speed capability and also the area covered in one pass. Also for a given ratio, drum surface speed relative to the ground speed of the machine, the surface speed of the drum will always be constant with varying drum diameters. There presents an option to use the most practical drum diameter for the purpose. As the diameter of the drum decreases the revolutions will increase while the drum surface speed remains constant. A smaller diameter drum will have less holes around its circumference, which in turn will require a smaller suction pump but the centripetal forces on the seeds attached to the drum outer surface will be greater. The optimum is therefore a balance between the two.

FIGS. 19, 20 and 21 show the use of various means 27, 29 and 50 to block the apertures on the drum away from the metering area of the drum 24 to help to concentrate the suction pressure for effective seed pick up at the metering section of the drum 24.

Referring to FIG. 19 there is shown a seed distribution apparatus with a continuous belt 27 travelling around a set of rollers 26. The belt is sucked onto the surface of the drum by the negative pressure inside the drum through the holes on the surface of the drum. The rotation of the drum causes the belt to be driven. A tension roller 28 ensures belt adhesion to the drum surface and belt rotation by the drum. The purpose of this belt is to block holes on the section of the drum surface not required for particle separation thereby concentrating maximum suction in the section where particle separation occurs. This feature enables smaller volume suction pumps to be used for a given drum size. Wedge shaped restriction devices 25 are used in the gaps.

Another example providing the same feature is shown in FIG. 20 using an air restricting sleeve instead of a belt. FIG. 20 shows a sleeve with a hollowed interior as another example of a device to concentrate the suction pressure on the seed pick up section of the drum. The sleeve may be any shape with one example being a hollow cavity with only the underside perimeter making contact with the rotating drum thereby minimising drag.

FIG. 21 shows a thin flexible stationary belt—held in place by suction through the drum apertures—as another example of a device to concentrate the suction pressure on the seed pick up section of the drum.

Any section of the drum covered by a belt or sleeve as well as the section which has the seeds attached will assist in maximising the suction concentration on the remaining open section for picking up further seeds.

Section C: Conveying Metered Particles and Controlling Particle Exit Velocity

FIG. 22 relate to Section C of the block diagram of FIG. 1. A flow rate adjustable venturi 62 as shown in FIG. 22 is one example by which the metered particles can be moved along an individual tube 56 to seed an individual row. By varying the air flow through the venturi with adjustable pressure air nozzle 63 the speed of the seeds inside the delivery tubes can be controlled. The tubes conveying the particles for each row can be of varying lengths and set at variable spacings to provide an substantial number of row spacings thereby covering a wide distribution area relative to the drum width. In the case where the particles do not need to travel a great distance a venturi system may not be required as the particles can fall down each tube under gravity to the soil.

Electronic sensors 66 at the end of each pipe which convey the metered particles and set the row widths enable particle flow or pipe blockage monitoring. Sensors which monitor the exit speed of particles can also be used. By monitoring the exit speed of metered particles the ability to maintain particles travelling at the same speed as the ground speed but in the opposite direction allows for increased accuracy of particle placement when the machine is travelling at speed and thereby minimising particle bounce. To set the travel speed of the particles within each pipe for each row it is simply a matter of increasing or decreasing the airflow through the venturi delivery system as required. The sensor system also can provide for an accurate particle count.

Where particle speed monitoring is not required a sufficient air flow speed can be set to move particles along delivery pipes without blockages occurring and maintain inter particle spacing. If particles have to be slowed down (eg for deeper burial) they can be passed through a braking system to minimise particle bounce. One example is using a cyclone. Particles which require deeper burial would usually be sown at slower speeds.

FIG. 22 shows metered seeds 74 from one row of drum along trajectory 15 entering the suction side of a venturi 64 which has a variable pressure nozzle 63 allowing the velocity controlled transport of metered seeds along the delivery tube 56. Also shown is an electronic device 66 at the end of the delivery tube which can perform various functions such as counting, velocity monitoring and blockage detection.

The function of Section C is to accept the metered seeds from metering drum of Section B and convey them to the exit system. This process can be accomplished in several ways including pneumatic or mechanical means. One method is to have a system involving the guidance of the metered seeds originating from the rows of holes on the drum in Section B into the suction sides of multiple venturis with one venturi corresponding to one drum row of apertures. The venturi system will cause the seeds to travel along tubes or veins to their required exit points. If flexible tubes are used this will allow the distance between exit points to be variable allowing for the easy spacing of seeding row widths on the ground. Each row results from a particular tube which originates from a corresponding venturi which gets seeds from a particular row of holes on the drum in Section B and the spacing of each seed is set by the distance between the holes making up the rows on the drum and the rotational speed of the drum surface in relation to the forward ground speed of the machine.

By controlling the venturi system one is able to control the exit velocity of the seeds at the end of the tube. The advantage of controlling and by implication being able to vary the exit velocity of the seeds becomes clear at high machine travel speeds. A machine travelling in one direction at a ground speed of 50 kilometers per hour ejecting metered seeds horizontally from a height of 0.5 meters and in the opposite direction at 50 kph will substantially have the same effect as dropping seeds from stationary position at 0.5 meters height resulting in minimal seed bounce and the maintenance of relatively even seed spacing.

Section D: Particle Exit Velocity and Tube Blockage Monitor

The function of Section D is to monitor the velocity of seeds exiting the tubes originating from Section C. This is achieved by electronic sensors 66 providing data which is transferred to the electronic control of Section E where it can be used to alert the system to a blockage resulting in failure to seed on a particular row as well as enabling the setting of exit velocities to match machine ground speeds.

The electronic sensors 66 can be used to count seeds thereby providing a means for varying the seeding rates.

Section E: Control Unit

The function of Section E is to monitor and control the various operations on the machine including items such as seed exit velocity, machine ground speed, drum surface speed, drum revolutions per minute, seed count, area covered, seed rate per hectare, hopper seed levels, venturi output etc. Electronic control unit is a preferred embodiment; however some functions could be mechanical.

In the form where the drum of Section B is not driven mechanically by a ground wheel but driven by a speed controlled electric motor, the electronics in Section E would monitor signals from a ground wheel sensor and regulate the rate of drum revolutions as required. A distinct advantage of this system over the mechanical ground wheel option is the allowability of small increments of about 1% increase or decrease of the seeding rate while in action. Therefore such a system can be connected to a Global Positioning System (GPS) with paddock mapping information and other tools to vary the rate as the optimal rate has been determined to vary in any localised position. The electronic control also would enable the speed of the accelerator belt/roller system of Section A to be varied relative to the drum surface while in action to accommodate various particle types. For example some seeds such as round soya beans will flow more readily than odd shaped corn seeds.

Section F: Main Stream Unmetered Particles Recycle/Return System

The function of Section F is to collect all the seeds coming from Section B which were not separated off by Section B and return them to the main storage bin or to the receival hopper in Sections 1 and 2.

The excess particle recycle system of Section F can be varied. For example if Sections 2, A and B of the assembly are situated above the main seed storage bin the seeds will be lifted into the receival hopper of Section 2 from the main storage bin. In this form, means are required to lift the particles from the main particle storage bin into the particle receiver hopper of Section 2. This can be pneumatic or mechanical methods such as conveyor, or auger. The excess particles will then fall back into the main storage bin under gravity.

Another variation has the combination of Sections 2 as shown in FIG. 3 as well as Sections A and B of the assembly situated below the main seed storage bin. In this form the receival hopper can be supplied by gravitational means and the seeds from Section F can be returned to the main storage bin by pneumatic or mechanical means. FIG. 4 shows another variation with Section 2 at the side of the main storage bin.

Section G: Particle Incorporation into Soil

FIGS. 23 & 24 relate to Section G of block diagram of FIG. 1.

Conventional seeders used to sow cereal crops usually place seeds into the ground along furrows which are formed by tynes or discs and then covered by press wheels or other covering mechanisms. The depth of seed placement is usually governed by soil moisture and plant type as some require greater seed placement depth. The speed of these planters is also governed in part by sowing depth and is typically 5 to 15 kilometers per hour.

Unlike the ability of some seeds with wing structures to fly on the wind, or some to attach themselves to passers by, nature has not to date provided seeds with a self burial mechanism. It can therefore be logically assumed that the deep placement of most seeds below the surface is not normally required unless soil moisture is an issue. It is well established that most grasses and therefore cereal crops will germinate adequately if sown at just below the surface in conditions of ample soil moisture. In fact research has demonstrated that many advantages are gained by optimum depth of seed placement with the optimum tending to be shallower rather than deeper.

Two examples of methods for incorporation of the metered seeds into the soil at higher than conventional sowing speeds are shown in FIGS. 23 and 24. These form part of the embodiment of the apparatus.

FIG. 23 shows two rollers 53 separated front and back but joined by a common frame 60. This arrangement can be formed by single rollers or made up of a combination of rollers or press wheels. Between the front and back rollers are mounted ground ticklers 54 attached in a way that they can be moved vertically relative to the rollers 53. In this way the depth of the ground ticklers can be set and maintained by the rollers as they travel along the soil surface. The front roller can be contoured in any way which assists the placement of seeds eg it can be shaped to leave ridges and furrows in the soil. Allowing the front roller to be lifted off the ground will also enable easier turning of the seeding apparatus.

As can be seen by the apparatus shown in FIG. 23 the tube 56 conveying seeds is placed in front of the first roller in a position so that excess air which carries the seed in the tube can be dissipated 55 before it reaches the roller thereby preventing the seeds from being blown out from under the roller. The momentum of the seeds will enable an accurate placement 57 of each row of seeds under the front roller thereby minimising seed bounce and maintaining accurate seed placement.

The ground ticklers 54 which can be of one of many shapes such as spring tynes, are attached to the support frame and the depth and angle—variable aggression action—is set to provide the necessary soil movement required to mix in and thereby incorporate the seeds. The ticklers are spaced on the support frame to maximise the required outcome while minimising a raking of trash. The back roller which can also be shaped to provide the required outcome presses the soil and seed together and expels excess air from the soil surface thereby assisting germination. By setting the tips of the ground ticklers to for example 20 millimeters, it would be difficult to bury the seeds any deeper than 20 millimeters.

FIG. 24 shows a variation of the two roller unit above the seeds being shot 61 into the soil 58 which has been fluffed up by the ground ticklers 54 and the depth of seed placement being determined by the tickler setting as well as the exit

The invention claimed is:

1. Seeding apparatus for metering and delivering seeds for planting in a seed bed, comprising:
   a rotatable seed metering element having a row of circumferentially spaced apart apertures on a rotating surface of the metering element;
   vacuum generating means arranged to draw air inwardly through said apertures whereby to attract and hold seeds to said apertures; and
   means for rotating said metering element,
   a feed system for transporting seed from a seed reservoir to said metering element and placing said seed at said rotating surface so that seeds are attracted to and held at said apertures;
   release means at a release point on the metering element for releasing seeds held at each said aperture of said rotating surface and carried to said release point; and
   delivery means for delivering said seeds to a seedbed, wherein
   (a) the metering element comprises a drum, the said rotating surface being an external cylindrical surface of the drum; and
   (b) in the feed system seeds are accelerated to an increased speed and thereafter placed adjacent to the surface of the drum and the metering apertures at a controlled speed.

2. Seeding apparatus according to claim 1 wherein the feed system comprises flow rate control means whereby seed is fed at a controlled flow rate from said reservoir to the drum.

3. Seeding apparatus according to claim 1 wherein the flow rate control means comprises a variable restriction to flow of seed into the feed system.

4. Seeding apparatus according to claim 1 wherein the velocity of seeds placed adjacent to the row of apertures is controlled to be approximately the same as the speed of the apertures.

5. Seeding apparatus according to claim 1 wherein the feed system comprises:
   acceleration means whereby seed entering the feed means is accelerated to a speed approximately the speed of the cylindrical surface of the drum; and
   velocity control means whereby seed leaving the acceleration means is placed adjacent to the row of apertures and its speed is controlled.

6. Seeding apparatus according to claim 5 wherein the acceleration means comprises a chamber in which seed falls downward whereby to be accelerated to an increased speed by the action of gravity on the seed.

7. Seeding apparatus according to claim 6 further comprising supporting means for maintaining the drum and the acceleration means substantially level in use.

8. Seeding apparatus according to claim 6 wherein the acceleration means further comprises means for redirecting seed reaching a lower part of the chamber into a direction approximately tangential to the drum surface.

9. Seeding apparatus according to claim 5 wherein the velocity control means comprises at least one moving belt that engages seed leaving the acceleration means the belt being of controllable speed.

10. Seeding apparatus according to claim 9 wherein seed passes between the or a said belt and the surface of the drum over a portion of the circumference of the drum.

11. Seeding apparatus according to claim 5 wherein the velocity control means comprises an adjustable flap and wherein seed passes between the flap and the surface of the drum over a portion of the circumference of the drum.

12. Seeding apparatus according to claim 5 wherein the velocity control means comprises a rotating roller whose speed and direction of rotation are controllable and wherein seed leaving the acceleration means passes between the roller and the surface of the drum.

13. Seeding apparatus according to claim 5 wherein the velocity control means comprises one or more of a: a moving belt; a rotating roller; and an adjustable flap engaging seed that leaves the acceleration means whereby to control the speed of the said seed leaving the acceleration means.

14. Seeding apparatus according to claim 5 wherein the feed system includes an airjet for blowing seed along a path that passes close to the surface of the drum and accelerates the seed to a speed substantially equal to the speed of the surface of the drum.

15. Seeding apparatus according to claim 5 further comprising recycling means for capturing the unmetered seed stream and returning the unmetered seed to the seed reservoir.

16. Seeding apparatus according to claim 1 wherein:
   (a) the feed system places seeds adjacent to the drum surface and apertures over a portion of its circumference;
   (b) the release point is circumferentially past the said portion so that seeds held at the apertures are carried beyond the said portion to the release point and at the release point released in a metered seed stream, and
   (c) the said portion and the said release point are so positioned that seeds not held at the apertures leave the drum surface in an unmetered seed stream separate from the metered seed stream before reaching the said release point.

17. Seeding apparatus according to claim 1 wherein the release means comprises an air jet nozzle directing an air jet to eject metered seeds off the drum.

18. Seeding apparatus according to claim 1 further comprising means for controlling the speed of seeds released from the drum by the release means.

19. Seeding apparatus according to claim 1 wherein seeds ejected from the delivery means are directed under a roller rolling on the seedbed whereby to limit seed bounce on the seed bed.

20. Seeding apparatus according to claim 1 having electronic sensing means at a point of exit of metered seeds from the delivery system, the sensing means providing output adapted for at least one of:
   (a) establishing exit speed of seeds from the delivery system for the purpose of controlling the seed exit speed and/or the depth of planting of seeds in the seedbed;
   (b) counting seeds delivered;
   (c) monitoring for blockage of the delivery system.

21. Seeding apparatus according to claim 1 wherein the row of apertures is one of a plurality of rows of apertures on the drum and wherein the delivery means is adapted to deliver a metered seed stream from each row of apertures to one of a plurality of transversely spaced-apart rows.

22. Seeding apparatus according to claim 21 wherein said control means further controls speed of exit of metered seeds from the delivery system.

23. Seeding apparatus according to claim 1 further comprising control means adapted to control at least drum rotation speed, flow rate of seed in the feed system, and seed velocity at the drum surface whereby to provide a selected seed delivery rate related to ground speed and required seed spacing.

24. A method for metering and delivering seeds for planting in a seedbed including the steps of:
  providing a rotatable seed metering element having a row of circumferentially spaced apart apertures on a rotating surface of the metering element;
  providing vacuum generating means arranged to draw air inwardly through said apertures whereby to attract and hold seeds to said apertures;
  rotating said metering element,
  by means of a feed system delivering seed from a seed reservoir to said metering element and placing said seed at said rotating surface so that seeds are attracted to and held at said apertures;
  at a release point on the metering element releasing the seeds held at each said aperture and carried to said release point whereby to form a metered stream of seeds; and
  delivering said metered stream of seeds to a seedbed,
  wherein:
  (a) the metering element comprises a drum, the said rotating surface being an external cylindrical surface of the drum; and
  (b) the method includes the step of accelerating seed in the feed system to an increased speed and thereafter placing the seed adjacent to the surface of the drum and the metering apertures at a controlled speed.

25. A method according to claim 24 including the step of controlling the flow rate of seed that is delivered to the feed system and thence to the drum.

26. A method according to claim 24 wherein the controlled speed at which seed is placed adjacent to the drum surface and apertures is approximately the same as the surface speed of the drum.

27. A method according to claim 24 wherein seeds entering the feed system are accelerated by falling through a vertical distance so as to be acted on by gravity.

28. A method according to claim 24 wherein seed placed adjacent to the drum surface is maintained adjacent to the drum surface over a portion of the drum surface circumference.

29. A method according to claim 28 wherein:
  (a) the release point is circumferentially past the said portion so that seeds held at the apertures are carried beyond the said portion to the release point and at the release point released in a metered seed stream, and
  (b) the said portion and the said release point are so positioned that seeds not held at the apertures leave the drum surface in an unmetered seed stream separate from the metered seed stream before reaching the said release point.

30. A method according to claim 28 including the step of capturing the unmetered seed stream and returning the unmetered seed stream to the seed reservoir.

31. A method according to claim 24 wherein delivery of the metered stream of seeds is by a delivery system and the speed of exit of seeds from the delivery system is controlled.

32. A method according to claim 24 wherein seeds are metered at a rate sufficient for seed placement at a selectable along-row seed spacing and at a ground speed substantially greater than 20 kilometers per hour, preferably between 30 and 60 kilometers per hour.

* * * * *